(12) United States Patent
Wiesener et al.

(10) Patent No.: US 6,546,676 B2
(45) Date of Patent: Apr. 15, 2003

(54) DEFLECTION DEVICE FOR BIRDS, AND FOR PIGEONS IN PARTICULAR

(76) Inventors: Bernd Wiesener, Zeitinger Strasse 64, D-13465 Berlin (DE); Robert Wiesener, Edithstrasse 21, D-16540 Hohen Nuenendorf (DE); Mark Wiesener, Knobelsdorffstrasse 2, D-14059 Berlin (DE)

(*) Notice: Subject to any disclaimer, the term of this patent is extended or adjusted under 35 U.S.C. 154(b) by 107 days.

(21) Appl. No.: 09/750,677

(22) Filed: Dec. 29, 2000

(65) Prior Publication Data

US 2001/0017012 A1 Aug. 30, 2001

(51) Int. Cl.[7] .................................................. E04B 1/72
(52) U.S. Cl. ...................... 52/101; 119/52.3; 119/57.9; 43/1; 43/124; 256/11
(58) Field of Search .......................... 52/101; 119/52.3, 119/57.9; 43/1, 124; 256/11

(56) References Cited

U.S. PATENT DOCUMENTS

| | | | | | |
|---|---|---|---|---|---|
| 2,456,731 A | * | 12/1948 | Peles | ............................ | 52/101 |
| 2,475,047 A | * | 7/1949 | Peles | ............................ | 52/101 |
| 2,938,243 A | * | 5/1960 | Peles | ............................ | 52/101 |
| 3,282,000 A | * | 11/1966 | Shaw et el. | .................... | 52/101 |
| 3,407,550 A | * | 10/1968 | Shaw | ........................... | 52/101 |
| 5,058,335 A | * | 10/1991 | Richter | ........................ | 52/101 |
| 5,253,444 A | * | 10/1993 | Donoho et al. | .................. | 43/1 |
| 5,400,552 A | * | 3/1995 | Negre | ........................... | 52/101 |
| 5,433,029 A | * | 7/1995 | Donoho et al. | .................. | 43/1 |
| 5,691,032 A | * | 11/1997 | Trueblood et al. | .......... | 428/136 |
| 6,250,023 B1 | * | 6/2001 | Donoho | ....................... | 52/101 |

FOREIGN PATENT DOCUMENTS

| | | | | | |
|---|---|---|---|---|---|
| EP | 0 340 108 A1 | * | 4/1988 | .................. | 52/101 |
| FR | 2 693 080 A1 | * | 7/1992 | .................. | 52/101 |
| FR | 2 680 447 A3 | * | 8/1992 | .................. | 52/101 |

\* cited by examiner

*Primary Examiner*—Lanna Mai
*Assistant Examiner*—Dennis L. Dorsey
(74) *Attorney, Agent, or Firm*—Notaro & Michalos P.C.

(57) ABSTRACT

A modular deflection device for securing to buildings to prevent birds, particularly pigeons, from roosting. The deflection device has a plurality of base rails arranged parallel and forming a web of modules divided by break points. The device includes a plurality of the modules, each having bent metal pins anchored thereto. The ends of the pins extend upwardly and outwardly, acting as spaced deflection elements to prevent birds from roosting over the deflection device. Preferably, one pin end extends perpendicularly upwards, while the other pin end extends outwardly at about 30° from vertical. The modules are separable at the break points for quickly fitting to a length of a building feature such as a ledge or molding.

11 Claims, 3 Drawing Sheets

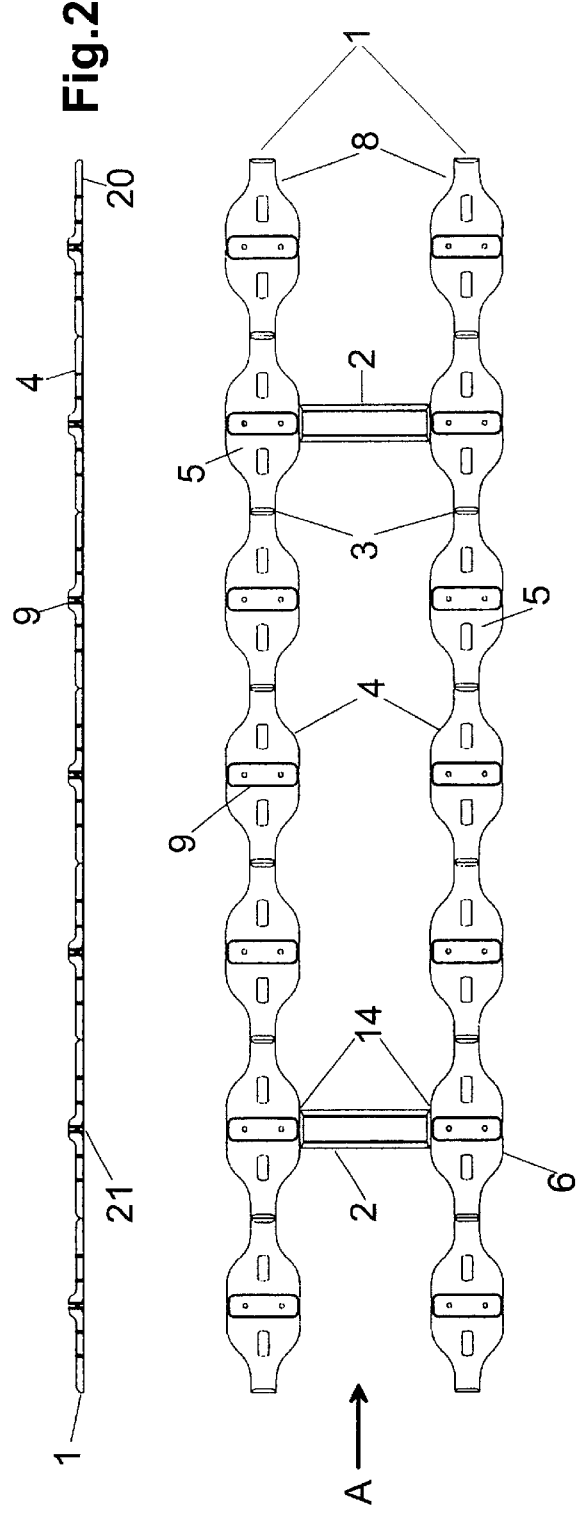

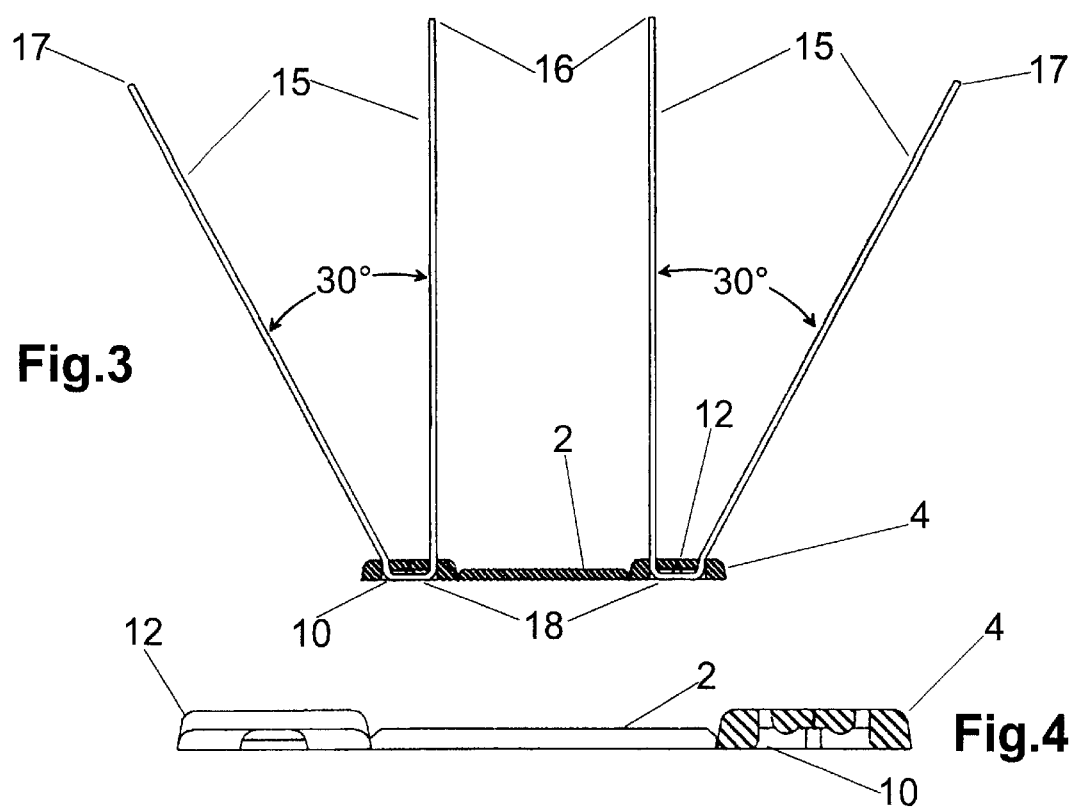

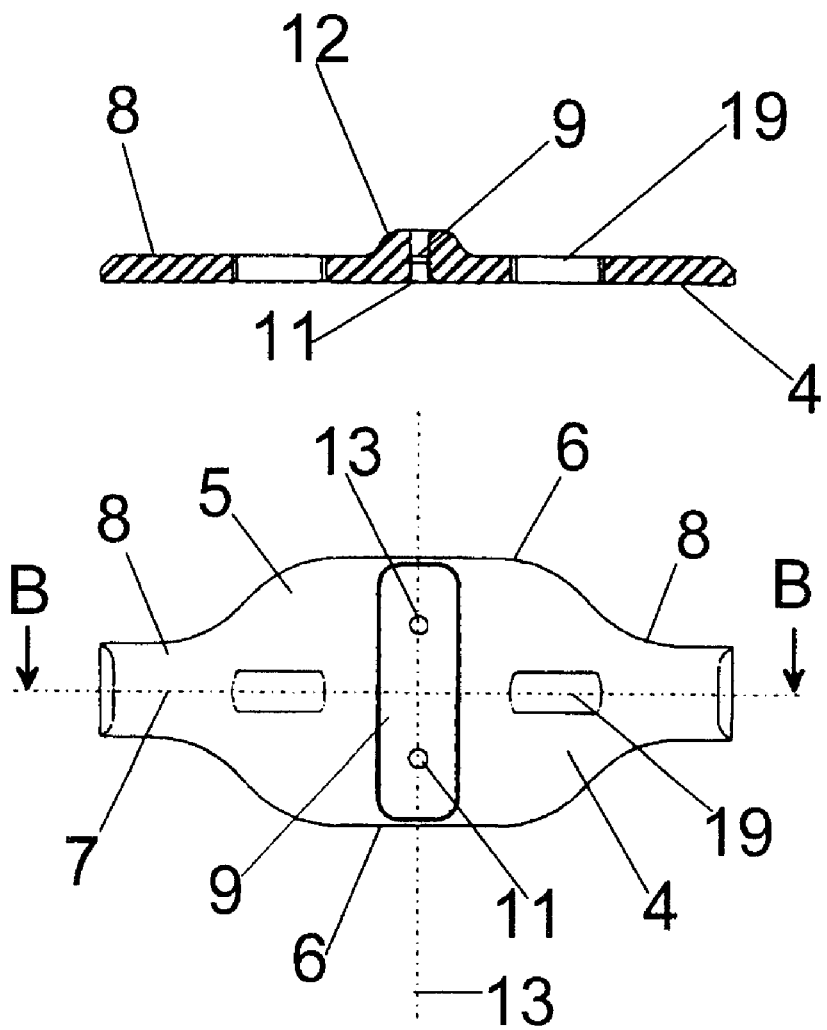

DEFLECTION DEVICE FOR BIRDS, AND FOR PIGEONS IN PARTICULAR

FIELD AND BACKGROUND OF THE INVENTION

The invention relates to a deflection device for birds, and for pigeons in particular, with a plurality of longitudinally-extended and relatively slightly flexible parallel base elements, of identical design, made of plastic, arranged at a distance from one another and spaced above one another, running perpendicular to the longitudinal axis of the base elements, connected by webs each featuring at least one predetermined break point, and individually separable, which in each case feature a raised section with a cut-out on the underside, and at least one aperture extending from the latter section to the upper side of the raised section, and with a plurality of deflection elements in the form of bent metal pins arranged at a distance from one another along the length of the base elements, the bent section of said pins being retained in each case in the raised section of the module allocated thereto, and the ends of which, located closest to the adjacent base element, extend perpendicularly upwards over the raised section of the module, while the other end of each metal pin extends from the raised section of the module outwards and upwards.

With the known deflection devices of this kind for birds, and for pigeons in particular, with two longitudinally-extended parallel base elements made of normal plastic (FR 2 730 383 A1), the metal pins are preformed in their totality to be V-shaped, with a central C-shaped section, and with the latter section having a rectangular chamber accessible from the underside of the module of the corresponding base element allocated thereto, held in the raised section of the module, which is hump-shaped. The two preformed ends of the metal pin run through an aperture extending from the chamber to the upper side of the hump, and then from the upper side of the hump on the one side perpendicularly upwards and, on the other, at an angle outwards and upwards. The preformed metal pins can be rotated out of their retained position in the chamber, and removed from it. The humps of the modules of each base element are in each case connected by means of a web to the corresponding humps of the modules of the other base element, whereby each web features a fractured groove in the centre, located in a plane parallel to the longitudinal axes of the base elements. The perpendicular ends of the metal pins are in each case adjacent to the web allocated to it, while the other ends of the metal pins, running at an angle, extend in each case on the side of the corresponding hump which is opposed to the web, and upwards and outwards from the hump.

Apart from the fact that with this known deflection device, with base elements made of normal plastic, the retention stability of the preformed metal pins in the chamber may be damaged in the long term by environmental influences, the adaptation capacity of this deflection device is restricted to disadvantage in the event of projecting or protruding building parts of low depth. For example, the use of a base element after separation from a multiple-row deflection device for deflection on the face of a building with a depth of less than 2 cm is ineffective, due to the web halves continuing to be connected to the humps of the modules of the base element, since the base element cannot be positioned tightly enough against the adjacent building wall.

SUMMARY OF THE INVENTION

The present invention is therefore based on the need to provide a deflection device for birds, and for pigeons in particular, of the type described in the preamble, which, with sustained retention stability of the deflection elements, is capable of being adapted easily, flexibly, and rapidly to the length and depth, for example, of the building surface which is to be protected, or of projecting or protruding parts of a building, of very narrow buildings in particular, and can be laid or fitted reliably and without excessive time commitment.

This objective is achieved according to the invention in that the middle section of each module of the rail-type base element, which is made of a UV-resistant plastic, runs transverse to the longitudinal axis of the module, and features two holes extending from the cut-out on the underside of the raised section to the upper side of said raised section, arranged at a distance from one another and symmetrically to the longitudinal axis of the module in the perpendicular centre plane of the raised section, and that the metal pin allocated thereto is retained in each case with the bent section in the cut-out on the underside, in contact with the raised section between the two spaced holes, and the ends of which extend through the spaced holes, out above the raised section, and that the spaced webs are retained on each side at the base elements allocated to them by means of a predetermined break point.

For preference, the pigeon deflection device according to the invention features two base rails made of plastic, each of which is formed of seven or eight modules, held together by at least two webs, which are provided between each of the modules of the two plastic base rails, said modules corresponding to one another in their sequence. For preference, the ends of the metal pins, which extend upwards and outwards from the raised section of the allocated module, are directed at an angle of about 30° to the vertical.

It is also possible for provision to be made for four plastic base rails, each of which is formed of two to nine modules, being mounted on the adjacent plastic base rails in each case by two to nine webs, so that a universally-implementable pigeon deflection spike system is provided, the length of which can be varied.

The metal pins are made of stainless steel (V2A or V4A), with a thickness of about 1.2 mm. The ends of the metal pins which project out of the raised section of the modules have a length of about 115 mm.

For preference, an oval or rectangular perforation is provided in each module on both sides and at an equal distance from the raised section of the module on its longitudinal axis, through which the deflection device can be secured by retaining elements to, for example, rainwater gutters. For preference, the plastic rails forming the basis for the deflection device and the webs which connect them are made of UV-stabilized polycarbonate or styrene acrylonitrile polymerisates. When the base is manufactured using the injection moulding process, the bent metal pins can be "enclosed" in a suitable manner before the hardening of the plastic from the cut-out on the underside, with their ends through the holes of the raised section, whereby one end of the metal pin is left in its position extending perpendicularly upwards above the raised section, and the other end of the metal pin is angled outwards by about 30° from the vertical.

The deflection device according to the invention is characterised in particular by its flexible adaptation to the spatial circumstances of the particular place of use, as well as by its very rapid installation capability, favoured by this flexibility. The plastic base rails can be divided in their length at the predetermined break points between the modules, as a result of which the deflection device can be universally applied, for example as a two-row or four-row deflection system with a width of approx. 17 cm or approx. 6 cm respectively, and in varying system lengths of, for example, 4.7 cm to 33 cm. For preference, the distance between modules is about 47 mm and the height of the deflection device about 11.5 cm. The width of the base of the deflection device can be varied in an appropriate manner by breaking off the webs at the corresponding predetermined break points of adjacent plastic base rails. In an embodiment with a single plastic base rail about 2 cm in width and a metal pin end extending perpendicular on one side, it is possible to make use of the deflection system on the faces of buildings with depths of less than 2 cm. The underside of the base of the deflection device is provided with a suitable adhesive surface structure, on which silicone paste can be applied to secure the device on a desired surface.

BRIEF DESCRIPTION OF THE DRAWINGS

The drawings show:

FIG. 1 A plan view of the base of an embodiment of the deflection device, with two plastic base rails;

FIG. 2 The view of a longitudinal side of the base of the deflection device;

FIG. 3 A front view, partially in section, of the base of the deflection device in an enlargement, seen in the direction of the arrow A in FIG. 1;

FIG. 4 A sectional view through a deflection device with a base designed in accordance with FIG. 1, whereby the section is guided in the common perpendicular mid-plane of the raised sections of the modules arranged opposite one another, and running transverse to the longitudinal axis of the plastic base rails;

FIG. 5 A plan view of a module of the plastic base rails in an enlargement; and

FIG. 6 A view of a longitudinal section of the module along the line B—B in FIG. 5.

DESCRIPTION OF THE PREFERRED EMBODIMENT

As can be seen from FIG. 1, the base of the deflection device shown in FIG. 4 consists of two spaced plastic base rails 1, parallel to one another and of identical design, connected to one another by two webs 2. Each plastic base rail 1 consists in turn of seven modules 4, connected to one another by predetermined break points 3, one of which is shown in the enlargement of the plan view in FIG. 5. The modules 4 each feature an essentially plate-shaped basic body element 5, featuring parallel longitudinal edges 6, with ends 8 shaped on both sides in the direction of their longitudinal axis 7 to form a bottleneck, whereby adjacent ends 8 of the modules 4 are connected in a separable manner by the predetermined break points 3. Each module further features, in the centre of the basic body element 5, a raised section 9, extending transverse to the longitudinal axis 7 of the module 4 between the longitudinal edges 6 of the basic body element 5, said raised section featuring a cut-out 10 on its underside, as can best be seen from FIGS. 3 and 4. Two holes 11 extend from this cut-out 10 to the upper side 12 of the raised section 9 of the module 4, spaced at a distance from one another and symmetrical to the longitudinal axis 7 of the module 4 in the perpendicular mid-plane 13 of the raised section 9 of the module. As FIG. 1 makes clear, the webs 2 are arranged between the plastic base rails 1 perpendicular to their longitudinal axes 7, and in each case connected to the adjacent longitudinal edges 6 of the basic body element 5 of each second and sixth module 4 of the two plastic base rails 1 by means of predetermined break points 14.

From FIG. 4 it is clear that each bent metal pin 15 is guided from the cut-out 10 on the underside of the raised section 9 of the individual module 4 with its ends 16 and 17 through the two spaced holes 11, whereby the bent section 18 of the metal pin 15 is anchored in the cut-out 10 and the ends 16 of the metal pins 15 mounted in the nearest ends 16 of the modules 4 allocated to the adjacent plastic base rails 1 extend perpendicularly upwards over the raised section 9 of each module 4, while the other end 17 of the individual metal pin 15, as a result of subsequent bending, extends from the raised section 9 of the allocated module 4 in each case outwards and upwards at an angle of approx. 30° from the vertical.

As can be seen best from FIGS. 5 and 6, a rectangular perforation 19 is provided in each module 4 on both sides and at an equal distance from the raised section 9 of the module 4 on the longitudinal axis 7 of the latter, for securing retaining elements, not shown, by means of which the deflection device can be secured, for example, to rainwater gutters. The underside 20 of the plastic base rails 1 is, as indicated in FIG. 2, provided with a suitable adhesive bonding structure 21, in order to secure the base of the deflection device by means of a suitable silicone paste to a desired building surface, for example.

---

List of reference numbers:

1 Plastic base rails
2 Webs
3 Predetermined break points of the modules
4 Modules
5 Basic body element of the module
6 Longitudinal edges of the basic body element
7 Longitudinal axis of the basic body element
8 Ends of the basic body element
9 Raised section of the module
10 Cut-out
11 Holes
12 Upper side of the raised section
13 Perpendicular mid-plane of the raised section
14 Predetermined break points of the webs
15 Metal pins
16 Ends of the metal pins
17 Ends of the metal pins
18 Bent section of metal pins
19 Rectangular perforation
20 Underside of the plastic base rails
21 Adhesive surface structure
A Direction of view
B-B Sectional plane

---

What is claimed is:

1. A deflection device for preventing birds from roosting on buildings, the device comprising:

at least a pair of longitudinally-extending and flexible, parallel, UV-resistant plastic base elements arranged spaced from one another, each base element being formed by a plurality of modules connected to one another at predetermined break points, each module comprising: an upper side and an underside; a cut-out in the underside; a raised section in the center on each module upper side running transverse to the longitudinal axis of the base elements having a pair of holes in a perpendicular mid-plane of the raised section extending from the cut-out to the upper side at the raised section, the pair of holes being spaced apart symmetric about a module longitudinal axis; a deflection element formed by a bent metal pin having a bent section and two ends, the bent section being retained in the cut-out in contact with the raised section between the pair of holes with a first end of each pin closest extending perpendicularly upwards above the raised section through one of the holes, and the second end of each pin extending outwardly and upwardly from the raised section through the other of the holes; and at least a pair of spaced webs oriented perpendicular to a longitudinal axis of the base elements connecting pairs of adjacent base elements, each spaced web joined to each base element by a predetermined break point, so that the base elements are separable from the spaced webs.

2. The deflection device according to claim 1, comprising two base elements, each base element having at least seven modules.

3. The deflection device according to claim 2, wherein, in each module, the end of the bent metal pin extending outwardly and upwardly is oriented at an angle of approximately 30° from vertical.

4. The deflection device according to claim 1, wherein the end of the bent metal pin extending outwardly and upwardly is oriented at an angle of approximately 30° from vertical.

5. The deflection device according to claim 1, comprising between two and four base elements, each base element having from six to nine modules, each base element joined to an adjacent base element by between two to nine spaced webs.

6. The deflection device according to claim 5, wherein, in each module, the end of the bent metal pin extending outwardly and upwardly is oriented at an angle of approximately 30° from vertical.

7. The deflection device according to claim 1, wherein each bent metal pin is made from stainless steel (V2A or V4A), has a thickness of about 1.3 mm and the ends extending from the raised section each having a length of about 115 mm.

8. The deflection device according to claim 7, wherein, in each module, the end of the bent metal pin extending outwardly and upwardly is oriented at an angle of approximately 30° from vertical.

9. The deflection device according to claim 1, further comprising a pair of perforations through the module symmetrically spaced about the raised section on the module longitudinal axis.

10. The deflection device according to claim 1, wherein the base elements and the spaced webs are each made from UV-stabilized polycarbonate or styrene-acrylonitrile polymerisates.

11. The deflection device according to claim 10, wherein the base elements and spaced webs are formed as a unitary piece using injection molding, the bent metal pins being joined to the modules at the same time.

* * * * *